May 2, 1961 J. M. BROWNLOW ET AL 2,982,948

MULTI-MATERIAL FERRITE CORES

Filed Nov. 1, 1957

INVENTORS
JAMES M. BROWNLOW
ERNEST C. SCHUENZEL

BY William V. Schelberg

AGENT 2,982,948
Patented May 2, 1961

2,982,948

MULTI-MATERIAL FERRITE CORES

James M. Brownlow, Fishkill, and Ernest C. Schuenzel, Poughkeepsie, N.Y., assignors to International Business Machines Corporation, New York, N.Y., a corporation of New York Filed Nov. 1, 1957, Ser. No. 693,980

2 Claims. (Cl. 340—174)

This invention relates to magnetic core structures which exhibit new and useful magnetic characteristics. More particularly, it relates to computer type circuit elements using those ferromagnetic bodies known as ferrites.

When magnetic cores were first used as binary elements, they were considered as single flux structures. Devices using these cores were built with only this concept in mind. As the art developed, it was realized that magnetic cores actually consisted of a plurality of interrelated flux paths which, when used collectively or individually, could be the basis of a number of useful devices. These ferrite cores consisted of a homogeneous distribution of magnetic material compacted into a solid body of a given geometry. The circuits which utilized these core structures were necessarily restrictive in their application. In accordance with the present invention, ferromagnetic core structures are provided having distinct regions of magnetic material that exhibit a desired set of magnetic characteristics in order to achieve a wider application of ferrite cores in computer type circuits.

As illustrated in this specification, the principle of the invention is described with reference to the application of certain core structures as memory and logic elements.

Magnetic cores, when used as memory elements in computer type circuits, function by well-known mechanisms. In magnetic elements of ferrite material having substantially rectangular hysteresis characteristics, such as magnetic cores, the process of switching from one magnetic state of the element to the other by reversing an external magnetic field applied to the element is accomplished by domain wall motion. The domain wall motion will proceed until all the magnetic vectors of the material are substantially aligned in the direction of the reversed external field, the interval required for this domain wall progression determining the switching time of the element. One disadvantage associated with domain wall switching, with respect to high speed switching circuits, is that a relatively long time interval of the relative order of 0.5 to 5.0 microseconds may be required to switch a magnetic element, such as a core, by domain wall progression.

In the operation of the conventional toroidal shaped ferrite core in a coincident-current selection system, a given flux path, $n$, switches when the available pulse drive, $H/l_n$, exceeds the coercive force, $H_c$, of the material. The switching time $\tau_n$, associated with this process is given by the expression:

$$\frac{l}{\tau_n}=\frac{l}{S_n}(H/l_n-H_o)$$

where $S_n$ is a switching parameter which is related to the damping and loss mechanisms in the core. Since the available pulse drive varies with the length of the flux path, $l$, there is an increase in $\tau$ as the switching proceeds from the inner radial portion of the core to the outer radial portion. Thus, an overall longer switching time and non-uniform output pulse is observed.

One embodiment of this invention provides toroidal ferrite core structures wherein each flux path of the core switches at the same time.

As another feature of our invention, we have provided methods by which such ferrite cores may be prepared. These methods also find utility in preparing such computer circuit elements as the following:

In coincident flux memory storage systems, as shown in the copending application Serial No. 546,180, filed November 10, 1955, issued January 13, 1959 as Patent No. 2,869,112, on behalf of L. P. Hunter and which is assigned to the same assignee, ferrite cores having one or more openings are utilized. In this system, a half select signal on either one of two drive windings can, at most, merely saturate the core material around the drive hole and can do no more than set up a kidney shaped flux pattern in the larger sector of magnetic material. The coercive forces of the material in the effective toroidal core area surrounding the drive hole will determine the driving current which is necessary to establish the kidney flux condition. It is accordingly desired to have the local core area composed of a low coercive force material. The presence of a low coercive force material in the area surrounding the drive hole will reduce the noise signal obtained during the operation of the core as a memory element. The ferrite core structures made by the method of the present invention are also used in logical devices.

An object of this invention is to provide computer elements with distinct regions of ferrite magnetic material that individually exhibit desired magnetic characteristics.

Still another object is to devise magnetic storage elements exhibiting shorter and more uniform switching times.

As one feature of the present invention, a high speed memory device has been provided utilizing storage elements of ferrite material wherein each flux path of said material has essentially the same switching time. Thereupon, the switching process takes place by the simultaneous reversal of all the magnetic vectors in the material, and the observed switching time is thereby made shorter and more uniform.

As another feature of our invention, we have developed methods of making ferrite core bodies with different coercive forces in different portions of the structure.

Other objects of the invention will be pointed out in the following description and claims and illustrated in the accompanying drawings, which disclose, by way of example, the principle of the invention and the best mode, which has been contemplated, of applying the principle.

Figure 1:
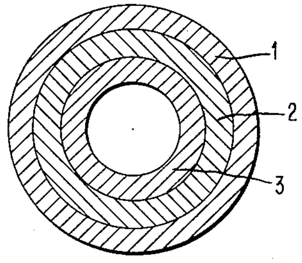
Fig. 1 is a cross sectional view illustrating a toroidal shaped core having concentric rings of ferrite material.

In the form of the invention illustrated by Figure 1, the concentric flux paths 1, 2, and 3 consist of ferrite material which switch at the same time. This embodiment provides the uniform switching of inner and outer radial portions of the core structure.

Figure 2:
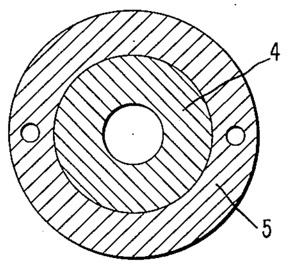
Fig. 2 is a cross sectional view of a pierced core element having concentric rings of ferrite material.

In Fig. 2, region 4 is of a lower coercive force than region 5. This structure results in less spreading of flux paths when the core is used as a coincident flux storage element.

Figure 3:
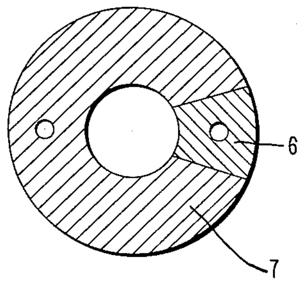
Fig. 3 shows a cross section of a pierced core element having distinct sectors of ferrite material.

Fig. 3 illustrates the use of a core having different coercive forces in different regions of a logical element. 6 is a low coercive force sector while the remaining portion of the structure 7 is a higher coercive force region.

Figure 4:
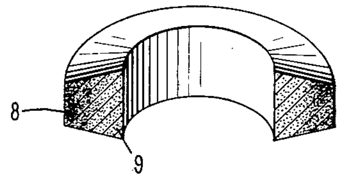
Fig. 4 shows a schematic representation of a toroid having beveled edges.
Figure 5:
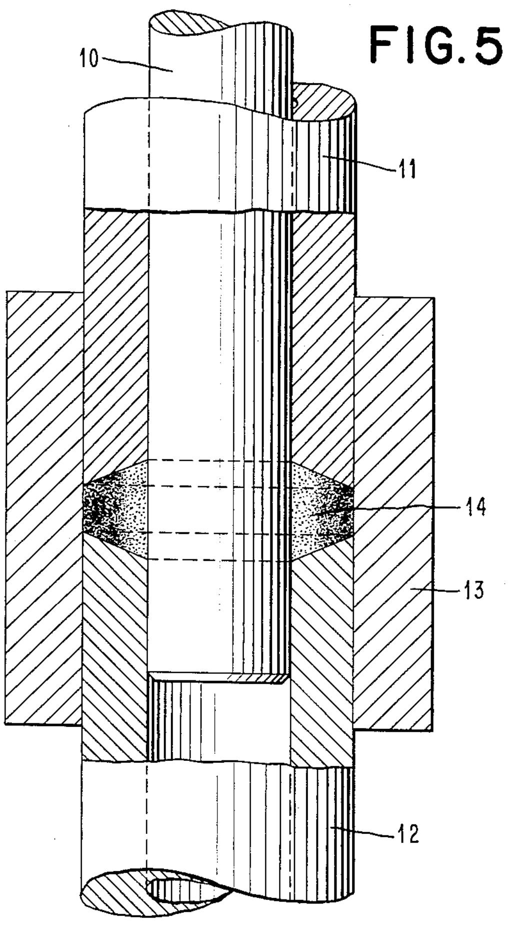
Fig. 5 shows a sectional view of a die used to prepare the beveled toroids.

In Fig. 4, the material in the region 8 is of higher pressed density than that of the same material in the remainder of the structure 9. This core is prepared by the use of the die shown in Fig. 5. In this figure, 10 is the core rod, 11 is the upper punch, 12 is the bottom punch, 13 is the core die, and 14 is the ferrite powders.

The diverse characteristics of a given region or flux path may be obtained by several methods according to the teaching of this invention. A gradient in coercive force threshold, for example, may be obtained in a toroidal sharped ferrite by utilizing the linear relationship between the grain size of a ferrite body and its coercive force. One way in which the particle size of a ferrite can be increased is by increasing the pressed density of the powders prior to firing. By establishing a gradient in pressed density in the presintered cores, for example, by means of the die shown in Fig. 5, ferrite structures having the desired gradient in coercive force threshold in given regions of the structure may be prepared. As will be shown in later portions of this application, memory elements prepared by the above method have more desirable switching characteristics.

The grain size of a ferrite in any given region may be increased by sintering that region at a higher temperature or for a longer interval than the remainder of the structure. Similarly, a heat sink may be established during the sintering process to produce a coercivity gradient. The latter method involves inserting one end of a metallic rod, such as rhodium, in the core hole and allowing the other end to act as the heat sink by protruding outside the furnace.

According to the present invention, desirable core structures were prepared by assembling sections of ferrite material to form a composite core having desired regions of ferrite material with desired coercive forces. One difficulty experienced in the past in attempts to change the coercive force of a part of a ferrite body by changing the pressed densities of that part resided in the fact that differences in coefficients of expansion of the ceramic parts compacted at different pressed densities resulted in sintered core bodies having either air gaps or cracks. Applicant has found experimentally that varying the compacting force of green manganese magnesium ferrite cores, for example, from 250 to 1000 lbs. decreased the final sintering shrinkage by about 1.8%. To compensate for this effect a change in the presintering or calcining temperatures was used to control the shrinkage rate during the final sintering step of that part of the assembly. It was found that an increase in the presintering temperature of 100° C. reduced the final sintering shrinkage by about 1.5%. An increase in the presintering time, at a given presintering temperature, had a similar effect in reducing the final shrinkage.

Another procedure which has been used to prepare the desired core structures comprised cutting out a sector of a toroidal shaped ferrite core and replacing it with a ferrite having a different coercive force. Similarly, assemblies may be made directly from ferrite powders having different coercive forces by using appropriate dies.

In order that the invention may be clearly and readily understood, there is described herein in some detail several sets of experimental results which illustrate the principles by which it may be carried into effect.

Example I.—Ferrite powders of the composition $Fe_2O_3$, 40.0; MgO, 37.5; MnO, 22.5; expressed in mol percents, were compressed into toroidal shaped cores having an inside diameter of $50\times10^{-3}$ inches and an outside diameter of $80\times10^{-3}$ inches. The density of the core was determined from its weight and volume. The green cores were sintered at 1380° for 65 minutes and the coercive forces of the sintered cores measured by conventional means. The results obtained were:

| Density (g./cc.): | Coercive force (oe.) |
|---|---|
| 3.35 | 1.175 |
| 3.47 | 1.14 |
| 3.58 | 1.13 |
| 3.85 | 1.12 |
| 3.99 | 1.115 |
| 4.32 | 0.995 |

*Example II.*—Ferrite powders of the composition $Fe_2O_3$, 42.5; MgO, 15.0; MnO, 22.5; expressed in mol percents, were compressed into toroidal shaped cores having an inside diameter of $50\times10^{-3}$ inches and an outside diameter of $80\times10^{-3}$ inches and the pressed densities determined as in Example No. 1. The green cores were sintered at 1420° C. for three hours and the coercive forces determined as in Example No. 1.

| Density (g./cc.): | Coercive force (oe.) |
|---|---|
| 3.56 | 1.30 |
| 4.05 | 1.24 |
| 4.22 | 1.22 |
| 4.32 | 1.14 |
| 4.37 | 1.135 |

*Example III*—Ferrite cores of the following composition $Fe_2O_3$, 41.2; MgO, 14.6; MnO, 41.2; and ZnO, 3.0; were prepared as described in Example I and sintered for one hour at 1400° C. to give the following results:

| Density (g./cc.): | Coercive force (oe.) |
|---|---|
| 3.02 | 0.761 |
| 3.215 | 0.741 |
| 3.39 | 0.693 |
| 3.69 | 0.679 |
| 3.78 | 0.669 |

*Example IV.*—Ferrites of similar composition as given in Example II were compressed to a density of 3.16 g./cc., and sintered at 1450° C. for varying sintering periods. The following coercive forces were obtained.

| Heating time (hrs.): | Coercive force (oe.) |
|---|---|
| 2 | 0.755 |
| 3 | 0.56 |
| 21 | 0.51 |
| 24 | 0.496 |

*Example V.*—Using ferrites of similar composition as given in Example III, the following coercive forces were obtained when the green core was sintered at a temperature of 1400° C. and a pressed density of 3.78 g./cc. for various times.

| Time (hrs.): | Coercive force (oe.) |
|---|---|
| 0.5 | 0.858 |
| 1.5 | 0.711 |
| 2.0 | 0.632 |
| 4.0 | 0.576 |
| 16.0 | 0.514 |

*Example VI.*—Using ferrites of similar composition as given in Example No. III, the following coercive forces were obtained when the green core was sintered for one hour at a pressed density of 3.78 g./cc. at various temperatures.

| Temp. (° C.): | Coercive force (oe.) |
|---|---|
| 1200 | 0.792 |
| 1350 | 0.685 |
| 1450 | 0.682 |

*Example VII.*—Using ferrites of similar composition as given in Example No. II, the following coercive forces were obtained when the green core was sintered for twenty-four hours, at a pressed density of 3.16 g./cc. at various temperatures.

| Temp. (° C.): | Coercive force (oe.) |
|---|---|
| 1400 | 0.65 |
| 1410 | 0.59 |
| 1430 | 0.496 |

*Example VIII.*—A ferrite core of the copper-manganese ferrospinel type, 4.44CuO, 51.11MnO, 44.44$Fe_2O_3$, expressed in mol percents, was prepared by pressing the powders into a toroid using core rods having a 30° bevel (see Figs. 4 and 5), thus giving a tapered shape to the structure, and sintered to form a solid body. The sintered core was pulse tested under the same conditions as a standard toroid memory core of the same composition having a substantially rectangular cross section. The following characteristics were obtained:

*Table*

| Core Shape | Peaking Time $T_p$ (μsec) | Switching Time $T_s$ (μsec) |
|---|---|---|
| Rectangular | 0.660 | 1.35 |
| Tapered | 0.575 | 1.18 |

We define the switching time $T_s$ as the duration of the output voltage pulse, as measured between the 10% amplitude points. The core was driven by current pulse of 0.670 amp. The peaking time is defined as the time it takes for the voltage output pulse to reach its maximum value. As can be seen from the above table, the core having the beveled edges showed a decrease in switching time ($T_s$) of over 12½% and a decrease in peaking time of 16%.

*Example IX.*—A compacted toroidal core of 42.5$Fe_2O_3$, 15.0MgO and 42.5MnO, expressed in mol percents, composition (I) (coercive force 1.3 oersteds) was calcined at 1000° C. for 2 hours. The mass was pulverized and compressed to form a toroidal shaped core having an inside diameter of 15 milli-inches, an outside diameter of 25 milli-inches and a thickness of 12 milli-inches.

Another toroidal core of 40.0$Fe_2O_3$, 37.5MgO, and 22.5MnO, expressed in mol percents, composition (II), (coercive force 2.2 oersteds) was calcined under the same conditions of time and temperature as composition I, since the coefficients of expansion of the two ferrites were nearly the same. The resultant mass was pulverized and compressed to form a toroidal shaped core in which the inside diameter was barely exceeded by the outside diameter of the core formed from composition I and the outside diameter was 50 milli-inches.

The two cores were assembled, compressed as a single body and sintered at 1300° C. for 30 minutes, furnace cooled to 1000° C. during 37 minutes and quenched immediately to room temperature. The resultant core showed no evidence of air gaps or cracks.

*Example X.*—The method of Example IX was repeated to produce a ferrite core body of the same dimensions in which the outer radial portion of the core contained the low coercive force material (composition I) and the inner radial portion of the core contained the high coercive force material (composition II).

*Example XI.*—The method of Example IX was used to produce a pierced ferrite core body (see Fig. 3) having a low $H_c$ sector of comp. I, approximately 30° at the O.D. and a high $H_c$ sector of comp. II.

*Example XII.*—A ferrite toroid having a low $H_c$ sector of comp. I approximately 30° at the O.D. and a high $H_c$ sector of comp. II was prepared by cutting out a sector from the fired toroid made from comp. II and replacing it with a fired sector of the same dimensions made from comp. I.

*Example XIII.*—A mixture of comp. I was compacted at 250 pounds to form a toroidal core, and calcined at 1000° C. for 2 hours. The mass was pulverized, and compressed to form a toroidal shaped core having an inside diameter of 15 milli-inches, an outside diameter of 25 milli-inches and a thickness of 12 milli-inches.

Another sample of comp. I was compacted at 625 pounds to form a toroidal core, and calcined at 1100° C. for 2 hours. The mass was pulverized, and compressed to form a toroidal shaped core having an inside diameter slightly less than 25 milli-inches, and an outside diameter of 50 milli-inches.

The two cores were assembled, compressed as a single body and sintered at 1300° C. for 30 minutes, furnace cooled to 1000° C. during 30 minutes and quenched to room temperature.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the following claims.

What is claimed is:

1. A magnetic memory element comprising a ferromagnetic core capable of assuming first and second states of flux remanence, said core comprising first and second sectors of said ferromagnetic material, said first sector having at least one hole therethrough, the coercive force of the ferromagnetic material in said first sector being lower than the coercive force of the ferromagnetic material in said other sector.

2. A high speed computer switching element, comprising a magnetic ferrite core capable of assuming first and second states of flux remanence, said core comprising a plurality of concentric flux paths "$n$," of lengths "$l_n$," the coercive force, $H_c$, of each of said paths being adjusted in accordance with its length at a given applied field, H, such that the excess field, $H/l_n - H_c$, required to switch each of said paths is a constant for each of said paths in said core, each of said paths thereby being capable of being switched by said applied field from one of said remanence states to the other at essentially the same time.

References Cited in the file of this patent

UNITED STATES PATENTS

| | | |
|---|---|---|
| 2,452,530 | Snoek | Oct. 26, 1948 |
| 2,452,531 | Snoek | Oct. 26, 1948 |
| 2,691,156 | Saltz | Oct. 5, 1954 |
| 2,709,248 | Rosenburg | May 24, 1955 |
| 2,805,408 | Hamilton | Sept. 3, 1957 |
| 2,829,338 | Lord | Apr. 1, 1958 |
| 2,847,639 | Howe | Aug. 12, 1958 |

UNITED STATES PATENT OFFICE

CERTIFICATE OF CORRECTION

Patent No. 2,982,948 May 2, 1961

James M. Brownlow et al.

It is hereby certified that error appears in the above numbered patent requiring correction and that the said Letters Patent should read as corrected below.

Column 1, lines 61 to 64, the formula should appear as shown below instead of as in the patent:

$$\frac{1}{\tau_n} = \frac{1}{S_n}(H/l_n - H_c)$$

Signed and sealed this 10th day of October 1961.

(SEAL)
Attest:

ERNEST W. SWIDER
Attesting Officer

DAVID L. LADD
Commissioner of Patents

USCOMM-DC